Jan. 23, 1973

B. R. BANUS 3,713,024

CALIBRATABLE AMMETER HAVING A RESTORING
MAGNET MOUNTED ON A BENDABLE TAB

Filed Dec. 17, 1964

INVENTOR.
BERNARD R. BANUS
BY
Ely, Boleich & Flynn

ATTORNEYS

United States Patent Office 3,713,024
Patented Jan. 23, 1973

3,713,024
CALIBRATABLE AMMETER HAVING A RESTORING MAGNET MOUNTED ON A BENDABLE TAB
Bernard R. Banus, Cleveland, Ohio, assignor to Sterling Manufacturing Company
Filed Dec. 17, 1964, Ser. No. 419,115
Int. Cl. G01r 1/00, 5/16
U.S. Cl. 324—146                                3 Claims

ABSTRACT OF THE DISCLOSURE

Calibratable current-responsive meter in which a magnet providing the restoring force for the indicator is mounted on a support bendable toward and away from a current-responsive magnet on the arbor of the indicator whereby the restoring force may be increased or decreased, respectively.

---

This invention relates to a calibratable ammeter.

Prior to the present invention a known type of D.C. ammeter has been made up of a rotatable arbor carrying a pair of axially spaced, permanently magnetized, sensing magnets, a current conductor extending across the arbor between the sensing magnets, a pointer connected to the arbor and movable over a calibrated scale, and a permanently magnetized restoring magnet inductively associated with one of the sensing magnets. In ammeters of this type, the magnetic field between the restoring magnet and the associated sensing magnet acts to position the rotatable assembly of the sensing magnets, the arbor and the pointer at a predetermined rotational position corresponding to the zero position on the meter scale. Direct current of one polarity or the other through the conductor will produce a magnetic field which interacts with the magnetic field between the sensing magnets to cause the arbor to rotate in one direction or the other, depending upon the polarity of the current being measured. The magnetic field between the restoring magnet and the associated sensing magnet, hereinafter called the "restoring field" opposes such rotation of the arbor. Therefore, the rotational position of the pointer for a given magnitude of the current through the conductor (i.e., the calibration of the meter) will depend upon the strength of this restoring field.

Prior to the present invention, in order to calibrate meters of this type the common practice has been to change the strength of this restoring field by increasing or decreasing the permanent magnetization of either the restoring magnet or the associated sensing magnets. This was done by bringing a relatively strongly magnetized permanent magnet in sufficiently close proximity to the meter to change the permanent magnetization of the restoring magnet or the associated sensing magnet to the desired extent. This required a high degree of skill and attention on the part of the operator and was time-consuming.

Also, prior to the present invention various arrangements have been proposed for calibrating such meters by adjusting the spacing between the restoring magnet and the associated sensing magnet to increase or decrease the restoring field between them. However, such previously proposed arrangements have been relatively complicated and expensive, as well as having other practical disadvantages.

The present invention is directed to a novel arrangement which overcomes the difficulties and disadvantages of the prior art and which enables the ammeter to be calibrated in a novel, simplified and advantageous manner.

Accordingly, therefore, it is a principal object of this invention to provide an ammeter having a novel and improved adjustable calibration arrangement therein.

Another object of this invention is to provide such an ammeter having a novel adjustable support for the restoring magnet which facilitates the calibration of the meter.

Another object of this invention is to provide such an ammeter which may be quickly and easily calibrated without requiring appreciable skill or attention by the operator.

Further objects and advantages of this invention will be apparent from the following detailed description of a presently-preferred embodiment thereof, which is illustrated in the accompanying drawing.

Figure 1:
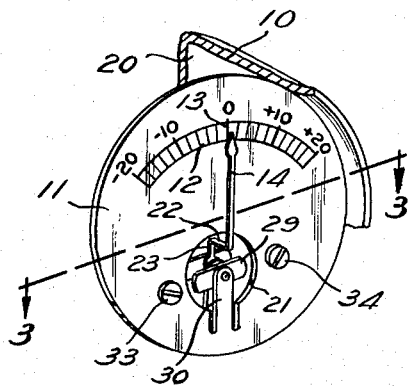
FIG. 1 is a front perspective view of an ammeter in accordance with the present invention.
Figure 3:
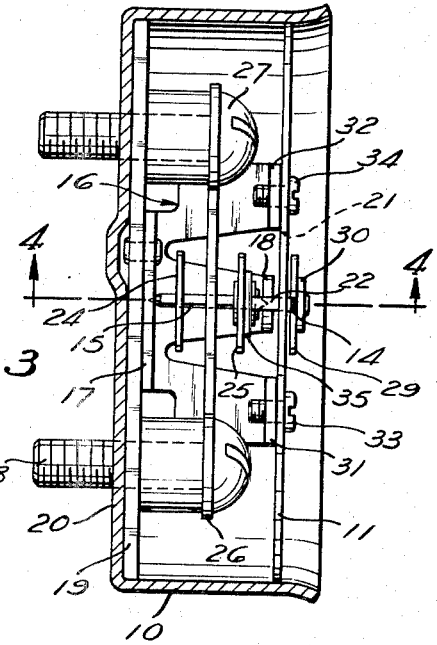
FIG. 3 is a horizontal section taken along the line 3—3 in FIG. 1.

Referring to FIGS. 1 and 3, the ammeter shown therein comprises a generally cup-shaped metal case 10 and a substantially flat, circular metal front panel 11 having a sliding fit in the case. The front panel 11 has an arcuate calibrated current scale 12 with a centrally located, vertically disposed zero point 13. A pivoted pointer 14 in front of the front panel 11 is movable over the scale to indicate the magnitude and polarity of the D.C. current then applied to the ammeter.

Figure 2:
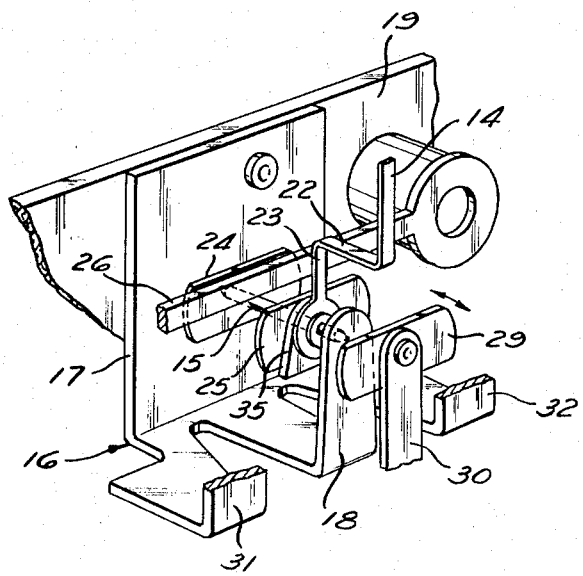
FIG. 2 is a fragmentary enlarged perspective view showing the operating parts of this ammeter.
Figure 4:
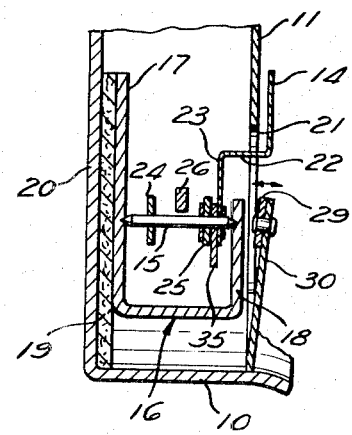
FIG. 4 is a fragmentary central vertical section taken along the line 4—4 in FIG. 3.

As best seen in FIGS. 2 and 4, the pointer 14 is mounted on a rotatable arbor 15, which extends horizontally from front to back inside the case 10. A rigid bracket 16 within the casing presents an upstanding back wall 17 and an upstanding central front leg 18. The arbor 15 has pointed opposite ends which are rotatably received in complementary recesses in the back wall 17 and this front leg 18 of the bracket. The back wall 17 of the bracket is riveted or otherwise rigidly attached to a rigid, flat, semi-circular insulation plate 19, which has a snug fit in the casing 10 just in front of the back wall 20 of the casing.

The bracket 16 also has a pair of opposite, upstanding, front end legs 31 and 32 (FIGS. 2 and 3) which are rigidly attached by bolts 33 and 34 (FIG. 3) to the front panel 11 of the meter.

As shown in FIG. 1, the front panel of the meter has an opening 21. The pointer 14 has a rearwardly extending horizontal portion 22 which extends back through this opening and a depending portion 23 extending down from the back end of portion 22 and rigidly connected to the arbor 15.

A small counterweight 35 is rigidly connected to the arbor 15 just behind the connection of the pointer 14 thereto.

A back sensing magnet 24 and a front sensing magnet 25 are rigidly attached to the arbor 15, axially spaced apart from each other behind the connection of the pointer 14 to the arbor. Each of these sensing magnets is a permanently magnetized, flat plate of relatively magnetically "hard" steel, having opposite polarity poles at its opposite ends, on either side of the arbor. On each side of the arbor, the confronting ends of these magnets 24 and 25 are of opposite polarities, producing magnetic fields between them.

A current conductor in the form of a straight horizontal bar 26 of electrically conductive material extends perpendicularly across the arbor 15 a short distance above the arbor and at a location substantially midway between the sensing magnets 24 and 25. The opposite ends of this current conductor 26 are connected to terminal screws 27 and 28, which extend through the back wall 20 of the case for connection in the external circuit. These terminal screws are insulated from the casing.

When direct current of one polarity, or sign, flows through the conductor 26, it produces a magnetic field around the conductor which interacts with the magnetic fields between the sensing magnets 24 and 25 to rotate the arbor 15 in one direction. When the current through conductor 26 is of the opposite sign, the rotation of the arbor 15 is in the opposite direction.

A restoring magnet 29 is positioned close to the front panel opening 21 in axially spaced, confronting relationship to the front sensing magnet 25 on the arbor. This restoring magnet is a permanently magnetized, flat plate of relatively magnetically "hard" steel. The opposite ends of the restoring magnet are of opposite magnetic polarity from each other and of opposite polarity from the confronting ends of the front sensing magnet 25. Accordingly, magnetic fields exist between the ends of the restoring magnet 29 and the front sensing magnet 25. These fields together constitute the restoring field opposing the rotation of arbor 15 in either direction from the centered position shown in FIGS. 1 and 2, at which the pointer 14 is at zero on the meter scale 12.

In accordance with the preferred embodiment of the present invention, the restoring magnet 29 is mounted on a manually bendable, elongated, upstanding tab 30, preferably formed integrally with the metal front panel 11 of the meter. The restoring magnet 29 is riveted or otherwise firmly attached to the upper end of this tab in front of the upstanding central front leg 18 of the arbor-supporting bracket 16 in the meter so that the magnetic axis of the restoring magnet 29 will be parallel with the effective magnetic axis of the sensing magnets 24 and 25 when no current is flowing through the conductor 26. If, due to manufacturing or assembly errors, the pointer 14 should not be precisely on zero of the scale 12, the pointer may be quickly set to zero by pivoting the magnet 29 on the tab 30 or bending the tab so as to effectively pivot the magnet about the axis of the arbor 15.

By bending the tab 30 forwardly or rearwardly, the restoring magnet 29 can be selectively positioned farther from or closer to the front sensing magnet 25, thereby decreasing or increasing the restoring field against which the pointer 14 is swung from its zero position by the force of the field of the current passing through the conductor 26 upon the field of the sensing magnets 24 and 25. Thus, the meter can be calibrated quickly and inexpensively by relatively unskilled operators, without the necessity of relatively elaborate techniques previously employed for this purpose, in the following manner: An uncalibrated (i.e. "test" meter is connected in series with a calibrated control meter in a line in which the amperage is adjusted to a pre-selected value, as indicated by the control, to which the test meter is to be calibrated. If the test meter reads less than the control, the tab 30 is bent by pulling the restoring magnet 29 away from the sensing magnets, thereby weakening the restoring field, until the pointer reads precisely to the amperage to which the test meter is to be calibrated. If the test meter reads more than the control, the tab 30 is bent by pushing the restoring magnet toward the sensing magnet until the pointer indicates the correct test amperage on the scale 12. The tab 30 will remain precisely in the position to which it has been finally adjusted, so that the meter will retain its calibration.

The foregoing procedure calibrates the ammeter from zero to a predetermined amperage, the normal calibration of an ammeter. In some instances it may be a matter of indifference if the ammeter reads precisely on zero when no current is passing through the conductor 26 but desirable, instead, to calibrate the ammeter to a range defined by a minimum limit current and a maximum limit current. In such cases, the test meter is connected in series with a control and calibrated, as above, to the maximum limit current being passed through the line. Twisting of the restoring magnet, if necessary, about its pivot point on the tab 30 permits the meter to be calibrated toward the lower limit current when it is sent through the line. Re-bending the tab 30 may then be necessary to recalibrate the meter to the upper limit current, but a balanced minimization of the errors between the upper and lower limits can be quickly obtained with a minimum of successive recalibrations.

In either case, i.e., wether calibrating to a single pre-selected current or a pre-selected range, calibration by mechanically adjusting the position of the restoring magnet carried by a bendable tab of relatively non-springing, dead-folding material avoids the danger of upsetting the control meter by a calibrating magnet—the means heretofore most commonly used for calibrating meters of the simple and rugged type disclosed—and also avoids the need for taking elaborate precautions against upsetting the control meters by a strong calibrating magnet.

While a specific, presently-preferred embodiment of this invention has been described in detail herein and illustrated in the accompanying drawing, it is to be understood that the invention is susceptible of other physical embodiments and that various modifications, omissions and refinements which depart from the disclosed embodiment may be adopted without departing from the spirit and scope of this invention. For example, a magnetically "hard" steel is the preferred material for the sensing and restoring magnets in the above specifically described embodiment of this invention, due to its low cost and availability in the form of strip, pre-magnetized to close manufacturing tolerances, from which the magnets may be stamped. However, other suitable and relatively permanently magnetizable alloys and materials may be employed. Also, the meter may be provided with suitable shunts so as to function as a voltmeter or as an ohmmeter.

What is claimed is:

1. A calibratable meter for measuring an electrical current having a front panel with a scale thereon, a pivoted pointer movable over said scale, means responsive to the current being measured to move said pointer from a zero position on said scale, a restoring magnet effective to urge said pointer to its zero position, and a bendable tab integral with said front panel and supporting said restoring magnet for adjustment toward or from said current responsive means and thereby selectively vary the restoring force which said restoring magnet exerts on the pointer.

2. A calibratable ammeter having a front panel with a scale thereon, a pivoted pointer movable over said scale from a zero position, front and back sensing magnets behind said front panel coupled to said pointer to turn therewith, current conductor means inductively associated with said sensing magnets to cause the latter and the pointer to turn from said zero position of the pointer in response to the current through said conductor means, a restoring magnet in confronting relationship to said front sensing magnet and providing therewith a magnetic restoring force urging said pointer to its zero position, and a bendable tab integral with said front panel and carrying said restoring magnet for adjustment toward and away from said front sensing magnet to selectively vary said restoring force for calibrating the ammeter.

3. A calibratable ammeter having a rotatable arbor extending from front to back therein, front and back sensing magnets spaced apart from front to back on said arbor, a current conductor extending across said arbor between said sensing magnets and inductively associated with said sensing magnets to turn the latter and the arbor in response to current through the conductor, a front panel extending in front of said arbor and said sensing magnets and said conductor, said front panel having an opening therein, a pointer connected to said arbor behind the front panel and extending through said opening in front of the front panel, said front panel having a bendable tab integral therewith which has a free end at said opening, and a restoring magnet attached to said free end of the tab in confronting, magnetically coupled relationship to the front sensing magnet and coacting therewith to provide a magnetic restoring force urging the pointer to its zero position, said restoring magnet being adjustable by bending the tab toward or away from the front sensing magnet to vary accordingly said restoring force.

References Cited
UNITED STATES PATENTS

| | | | |
|---|---|---|---|
| 2,362,562 | 11/1944 | Kelly | 324—146 X |
| 2,446,431 | 8/1948 | Pfeffer | 324—146 |
| 2,970,267 | 1/1961 | Pfeffer | 324—146 |
| 3,094,659 | 6/1963 | Pfeffer | 324—146 |
| 3,200,332 | 8/1965 | Pfeffer | 324—146 |

GERARD R. STRECKER, Primary Examiner

U.S. Cl. X.R.

324—154